US009015168B2

(12) United States Patent
Cai et al.

(10) Patent No.: US 9,015,168 B2
(45) Date of Patent: Apr. 21, 2015

(54) DEVICE AND METHOD FOR GENERATING OPINION PAIRS HAVING SENTIMENT ORIENTATION BASED IMPACT RELATIONS

(75) Inventors: Keke Cai, Beijing (CN); Rui Ma, Beijing (CN); Zhong Su, Beijing (CN); Xiao Xun Zhang, Beijing (CN); Hui Jia Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 470 days.

(21) Appl. No.: 13/053,360

(22) Filed: Mar. 22, 2011

(65) Prior Publication Data

US 2011/0231448 A1 Sep. 22, 2011

(30) Foreign Application Priority Data

Mar. 22, 2010 (CN) .......................... 2010 1 0131522

(51) Int. Cl.
*G06F 7/00* (2006.01)
*G06F 17/30* (2006.01)
*G06Q 30/02* (2012.01)

(52) U.S. Cl.
CPC .......... *G06F 17/30864* (2013.01); *G06Q 30/02* (2013.01)

(58) Field of Classification Search
CPC .............. G06F 17/30864; G06F 17/21; G06F 17/2745; G06F 17/30705; G06F 17/30873
USPC ................................................ 707/792, 794
See application file for complete search history.

(56) References Cited

U.S. PATENT DOCUMENTS

| 8,417,713 | B1 * | 4/2013 | Blair-Goldensohn et al. | 707/751 |
|---|---|---|---|---|
| 2004/0249650 | A1 * | 12/2004 | Freedman et al. | 705/1 |
| 2005/0091038 | A1 * | 4/2005 | Yi et al. | 704/10 |
| 2006/0036603 | A1 * | 2/2006 | Laney | 707/9 |
| 2006/0053156 | A1 * | 3/2006 | Kaushansky et al. | 707/102 |
| 2009/0048823 | A1 * | 2/2009 | Liu et al. | 704/9 |
| 2009/0164408 | A1 * | 6/2009 | Grigorik et al. | 707/1 |
| 2010/0119053 | A1 * | 5/2010 | Goeldi | 379/265.09 |
| 2010/0121849 | A1 * | 5/2010 | Goeldi | 707/736 |
| 2010/0262462 | A1 * | 10/2010 | Tryfon | 705/10 |
| 2011/0099052 | A1 * | 4/2011 | Brun et al. | 705/7.38 |

OTHER PUBLICATIONS

Lun-Wei Ku, et al, Mining Opinions from the Web: Beyond Relevance Retrieval, Wiley InterScience, 2007.

(Continued)

*Primary Examiner* — Azam Cheema
(74) *Attorney, Agent, or Firm* — Gibb & Riley, LLC (57) ABSTRACT

A device for generating opinion pairs having sentiment orientation based impact relations, having: a reception unit which receives a plurality of object-oriented opinions; an extraction unit which extracts opinions having impact relations among the plurality of object-oriented opinions; an analysis unit which analyzes sentiment orientations of the extracted respective opinions; and a generation unit which establishes correlations between the opinions having sentiment orientation based impact relations to generate the opinion pairs having the sentiment orientation based impact relations. The present device can search and locate more implicit opinions as supplementary opinions by detecting impact relations from a plurality of opinions, and help users interested in different objects obtain more comprehensive comments and summaries.

13 Claims, 6 Drawing Sheets

(56) References Cited

OTHER PUBLICATIONS

Weifu Du, et al. An Iterative Reinforcement Approach for Fine-Grained Opinion Mining, Human Lang, Tech: 2009 Annual Conf. of N.A. ch. of ACL., 2009.

Yun-King Xia, et al, The Unified Collocation Framework for Opinion Mining, Proceedings of 6th Int. Conf. on Machine Learning and Cybernetics, 2007.

Adam Westerski, Sentiment Analysis: Introduction and the State of the Art Overview, 2007.

* cited by examiner

DEVICE AND METHOD FOR GENERATING OPINION PAIRS HAVING SENTIMENT ORIENTATION BASED IMPACT RELATIONS

CROSS-REFERENCE TO RELATED APPLICATION

This application claims priority under 35 U.S.C. §119 from Chinese Patent Application No. 201010131522.7 filed Mar. 22, 2010, the entire contents of which are incorporated herein by reference.

BACKGROUND OF THE INVENTION

1. Technical Field

The present disclosure relates to a method and device for generating or retrieving opinion pairs having sentiment orientation based impact relations.

2. Related Art

With the universal use of web and the rapid expansion of e-commerce, more and more people express their opinions and reviews on the internet. Reviews and opinions are helpful for potential customers, product manufacturers and online merchants. Customers and manufacturers want to know the specific opinions on some given objects. Through summarizing these opinions, users can easily discover which objects are mostly concerned by customers and the overall sentiment orientation on each object. In general, people can concern different aspects of a product and focus on certain aspects to express views. For example, a customer who bought a laptop gives his comments on both aspects of display card and screen of the laptop. Another customer expresses his comments on the aspect of standby time for a battery. Summarizing all customers' comments is helpful to comprehensively reflect all aspects of the product. However, a customer who wants to know the performance of playing an E-game on the laptop can not find any directly helpful opinions from these two customers' reviews.

SUMMARY OF THE INVENTION

One aspect of the present disclosure provides a device for generating opinion pairs having sentiment orientation based impact relations, including a reception unit which receives a plurality of object-oriented opinions; an extraction unit which extracts opinions having impact relations among the plurality of object-oriented opinions; an analysis unit which analyzes sentiment orientations of the extracted respective opinions; and a generation unit which establishes correlations between the opinions having sentiment orientation based impact relations to generate the opinion pairs having the sentiment orientation based impact relations.

Another aspect of the present disclosure provides a method for generating opinion pairs having sentiment orientation based impact relations, including a reception step of receiving a plurality of object-oriented opinions; an extraction step of extracting opinions having impact relations among the plurality of object-oriented opinions; an analysis step of analyzing sentiment orientations of the extracted respective opinions; and a generation step of establishing correlations between the opinions having sentiment orientation based impact relations to generate the opinion pairs having the sentiment orientation based impact relations.

Another aspect of the present disclosure provides a device for retrieving opinions having impact relations, including a retrieval unit which retrieves, in response to a query received from outside, the opinions having the impact relations with an object of the query in a database, where the object of the query has sentiment orientation based impact relations with the opinions where impacted opinions are implicit opinions.

Another aspect of the present disclosure provides a method for retrieving opinions having impact relations, including receiving a query from outside, and retrieving the opinions having the impact relations with an object of the query in a database, where the object of the query has sentiment orientation based impact relations with the opinions where impacted opinions are implicit opinions.

The present disclosure can dig out more implicit opinions as supplementary opinions by detecting sentiment impact relations from a plurality of opinions, and help customers concerning about different objects acquire more comprehensive comments and summaries.

DETAILED DESCRIPTION OF THE PREFERRED EMBODIMENTS

In the following, some specific embodiments of the present disclosure will be described in detail with reference to the attached drawings. In respective embodiments, identical reference numbers are used to denote elements or units performing the same functions.

The meanings of terms used in the present disclosure are described as follows:

Opinion (for example comment and view): a subjective comment on a certain object.

Sentiment Polarity (or Sentiment Orientation): the sentiment tendency of a subjective comment on a certain object, which can be a positive polarity (commendatory) or a negative polarity (derogatory).

(Sentiment) Impact Relation: a kind of relation, the sentiment orientation of an object A can impact the sentiment orientation of another object B to some extent.

Opinion (such as comment, view) on a certain object: it can be indicated by "object+sentiment orientation" in general cases.

Implicit Opinion: an opinion which is not directly expressed in the text of a view, comment, and opinion, but can be reasoned according to the mined impact relations.

Opinion Pair: a combination of two or more opinions having sentiment orientation based impact relations.

Generally, there is correlation existing between different objects, and there is also impact relations existing between sentiment orientations for different objects.

Figure 1:
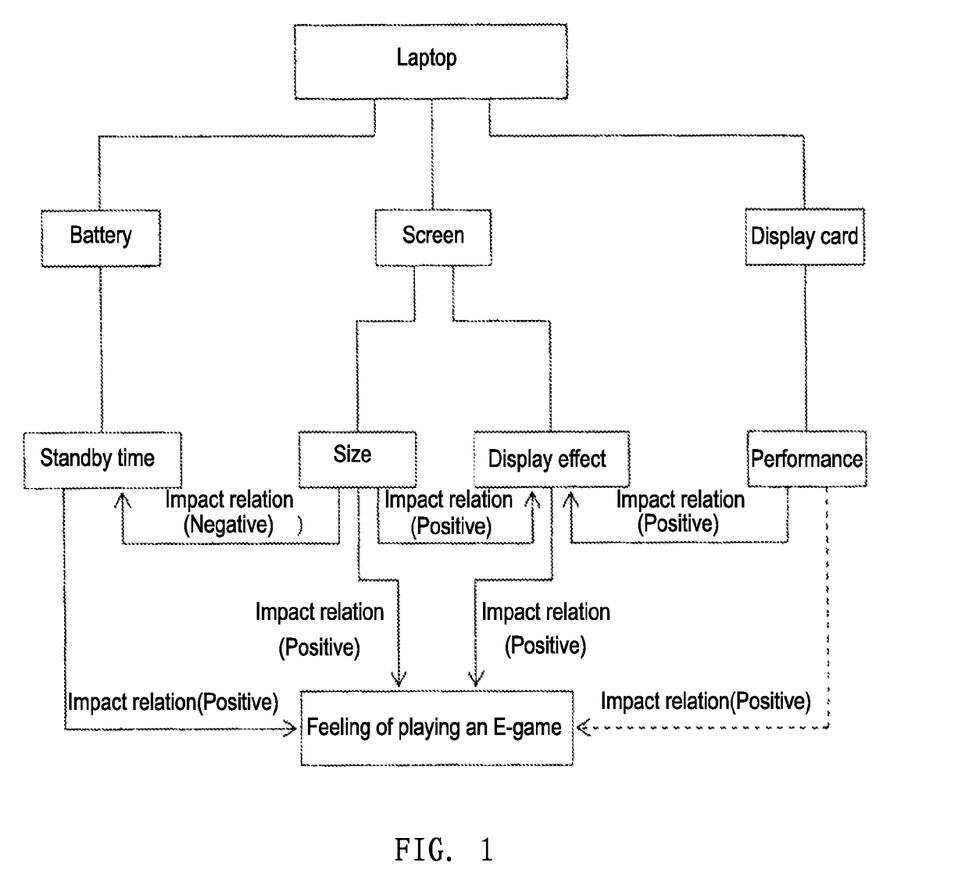
FIG. 1 is a diagram illustrating impact relations between the sentiment orientations of respective objects.

FIG. 1 is a diagram illustrating impact relations between the sentiment orientations of respective objects.

In FIG. 1, using a laptop as an example, a diagram for impact relations of different sentiment orientation of a part of objects is shown. For example, the laptop can include components such as a screen, a battery, a display card. For the screen, users' comments can relate to attributes such as size and display effect. As for the battery, the comment mostly concerned by users can relate to attributes such as the standby time of the battery. As to the display card, the problem concerned by users can be the performance of the display card. The screen, battery, and display card as components of the laptop as well as the size, display effect, standby time and performance as attributes are all referred to as objects Examples of the sentiment orientations for these objects can respectively be "large" or "small" (for the size of the screen), "legible" or "illegible" (for the display effect), "long" or "short" (for the standby time of the battery), and "high" or "low" (for the performance of the display card). According to the embodiments of the present disclosure, there are impact relations between the sentiment orientations of the respective objects. For example, the performance of the display card being high can make the display effect of the screen legible, the size of the screen being large can also make the display effect legible, and the size of the screen being large can make the standby time of the battery get shorter.

The present disclosure provides a method and device for digging out implicit opinions and generating opinion pairs according to the detected sentiment impact relations. As mentioned above, there are certain impact relations between the sentiment orientations of different objects. The method for the present disclosure is to dig out sentiment impact relations on the basis of analysis on a number of comment texts. Firstly, reception (detection) is performed for multiple object-oriented comment texts (opinions). Then, opinions having impact relations with other objects are extracted among the received opinions. Next, opinion pairs having sentiment orientation based impact relations can be obtained by performing sentiment analysis on these opinions having impact relations. Finally, a database containing a plurality of opinion pairs having sentiment impact relations can be built up by counting sentiment relations of the plurality of opinions (including that the confidence score of theses relations can be further calculated). Among the counted plurality of opinions having sentiment orientation based impact relations, the opinions to which an impact is applied can act as implicit opinions for the opinions applying the impact. According to the mined sentiment impact relations, the opinions relating to only one object will be supplemented by digging out opinions having sentiment impact relations with other objects.

Figure 2:
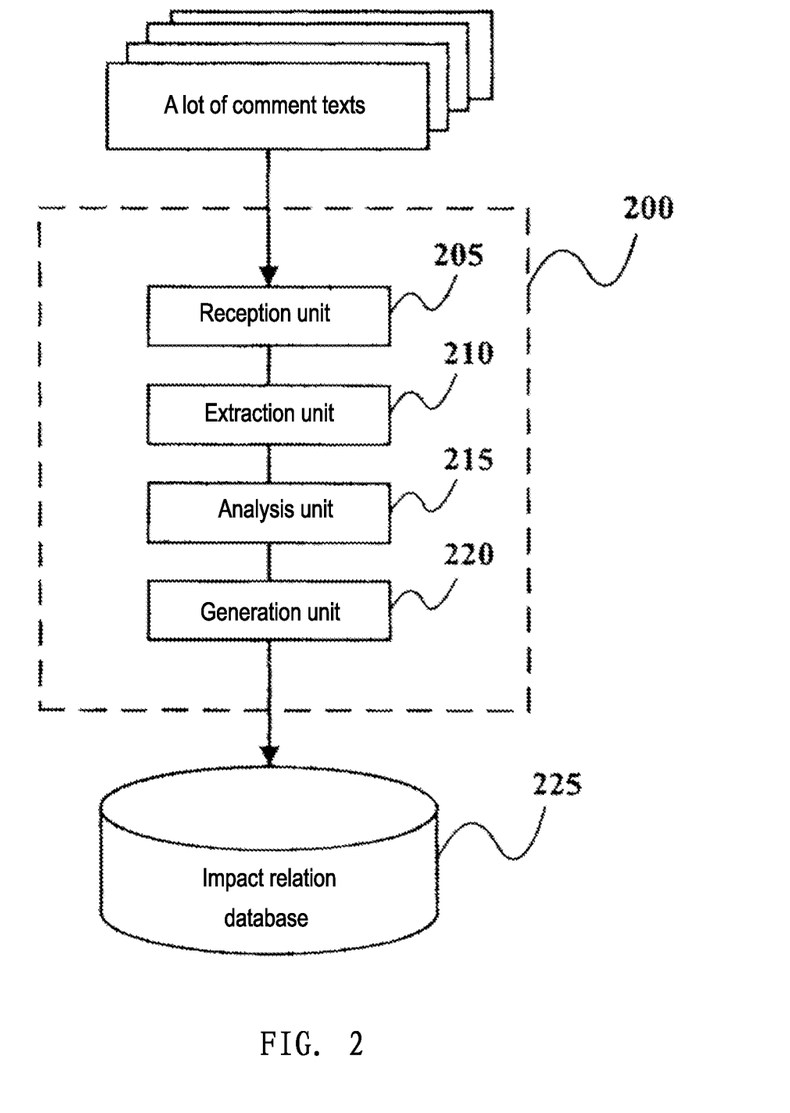
FIG. 2 is a block diagram showing a device for generating opinion pairs having sentiment orientation based impact relations according to one embodiment of the disclosure.

FIG. 2 is a block diagram showing a device for generating opinions having sentiment orientation based impact relations according to an embodiment of the present disclosure. As shown in FIG. 2, the device 200 for generating opinions having sentiment orientation based impact relations according to the embodiment of the present disclosure includes a reception unit 205, an extraction unit 210, an analysis unit 215 and a generation unit 220. The reception unit 205, the extraction unit 210, the analysis unit 215 and the generation unit 220 are sequentially connected with each other, respectively. The reception unit 205, the extraction unit 210, the analysis unit 215 and the generation unit 220 can also be connected with each other via a data and/or command bus and deliver necessary control information and/or data in accordance with requirements.

The device 200 for generating opinions having sentiment orientation based impact relations according to the embodiment of the present disclosure can further include: a CPU (Central Processing Unit) for executing related programs so as to process various data and to control operations of the respective units in the device 200; a ROM (Read Only Memory) for storing various programs required for the CPU performing various processing and controlling; a RAM (Random Access Memory) for storing intermediate data temporarily produced by the CPU in the procedure of the processing and controlling; an I/O (Input/Output) unit for connecting to external devices so as to transfer various data between the external devices and the device 200; a user UF (Interface) unit, including but not limited to a keyboard, a mouse, a display means for inputting/outputting view data which can be implemented by various display devices, and an audio means which can input/output sounds, for performing mutual operations with the users and for receiving operational commands input by the users; and a memory for storing various opinion data generated by the device 200.

The respective units as described above are not limiting the scope of the present disclosure. According to one embodiment of the present disclosure, the function(s) of one or more of the reception unit 205, the extraction unit 210, the analysis unit 215 and the generation unit 220 can also be implemented by a functional software in combination with the above CPU, ROM, RAM, I/O, I/F and memory. Furthermore, the function (s) of two or more of the reception unit 205, the extraction unit 210, the analysis unit 215 and the generation unit 220 can also be implemented by combining them into one unit.

According to an embodiment of the present disclosure, the reception unit 205 receives multiple object-oriented opinions (for example by searching/retrieving over the network). As shown in FIG. 2, these opinions can be a plurality of comment characters and/or original views input into the reception unit 205, which can be referred to as "original opinions". These opinions can also be those present on the network or in other information sources, and are obtained by the reception unit 205 through searching/retrieving over the network. Such network can be, but not limited to, either a WAN (Wide Area Network), including internet, MAN (Metropolitan Area Network), Enterprise Intranet, or a local area network, and can be either a wired network or a wireless network. These opinions can exist in the database of some nodes in the network. The opinions received by the reception unit 205 from the network can, for example, be "the performance of the display card, high", "the display effect, legible", "the size of the screen, large", "the standby time, long", and "feeling of playing the E-game, good".

The reception and detection of the opinions are technically referred to as Opinion Mining which firstly confirm the object on which the sentiment in an opinion (comment) acts, that is, a comment object, then analyze the sentiment tendency of the opinion of the comment object. For example, it is commented that "the screen of the computer is very legible", where "screen [display]" is the object of the comment, and "very legible" is an emotional word whose sentiment tendency is commendatory. That is to say, the comment is a piece of commendatory evaluation on "the screen" of the computer.

The method for the reception unit 205 receiving (searching/retrieving) opinions from Internet or other information sources can use, but not limited to, the method as follows:

(1) capturing information from the internet or other source using Web crawler technology for searching or other technology for searching;

(2) filtering the capture information to remove non-commentary information (objective information) and keeping commentary information (subjective information). Classification technology can be used to classify information into two classes: subjective and objective;

(3) extracting the comment object from the commentary. Currently, technical methods that can be used to extract comment object from the commentary include: (a) a rule based method in which the comment object is extracted by constituting a rule focusing on the interior grammar structure and context of the comment object. For example, the comment object is usually a phrase of noun (N) structure, and the phrase of noun structure can be extracted as the comment object, or the object modified by an adjective or emotional word is generally the comment object, (b) a learning (with teaching) based method which trains an entity identifying model by mostly labeling the training samples so as to automatically identify the comment object, (c) a method by the aid of semi-structure which can identify a comment object by some layout information of the comment itself, such as specification of a product and summary phrasal comments in the product comments. For example, in summary comments provided by many comment websites, reviewers are recommended to use brief comments such as "standby time is long" to summarize his or her own opinions on products. In such a method, opinions can be obtained by simply syncopating or matching with texts (based on an assumption that the diction custom of the same user does not change largely in the same comment); and (4), which can be the default, since diction customs of respective users are different from each other, words used by them can be different when expressing the same object. For example, one says "screen" and the other says "display screen", but they refer to the same object. Therefore, assembling comment objects in term of semantic correlation helps to find more comments correlated with the comment objects. Currently, Topic Model based technology can be used, in which the contexts of comment objects are used as semantic features, and the Topic Model is used to cluster the distributions of these semantics, so that the comment objects with similar distributions of semantics are specified as semantically related comment objects. Furthermore, there are a lot of implicit objects in comments. For example, the comment object in "this style of mobile phone is very beautiful" is "the appearance" of the mobile phone, which can be obtained by a method that the object word "appearance" is expressed by using the opinion word "beautiful". Also, refining of some objects can use the same method. For example, the comment object "screen" in "this style of computer's screen is very legible" can be expressed and refined to "screen [display]" by the opinion word "legible".

As described above, the expression structure of the received opinion can for example be the structure as "object, sentiment" which indicates a subjective comment on the object. For example, the opinions of "the display card, high", "the display effect, legible", "the size of the screen, large", "the standby time, long", "the feeling of playing an E-game, good" as described above.

The above methods are not limiting the technical scope of the present disclosure, and those skilled in the art can use other methods to receive (detect) opinions.

The reception unit 205 can output the received object-oriented opinions to the extraction unit 210, and can also store the received object-oriented opinions in for example the memory in which a lot of object-oriented opinions can be stored.

The extraction unit 210 extracts the opinions having impact relations among multiple object-oriented opinions received from the reception unit 205.

More specifically, those skilled in the art can extract the opinions having impact relations through, but not limited to, the following two ways: (1) the rule method: in many cases, the opinions having causal or impact relations are connected by some conjunctions, for example, "I like a mobile phone with a large screen very much, but the standby time of such mobile phone is usually too short!"; by the conjunction "but" in the exemplary sentence, it can be reasoned that a pair of opinions have certain impact relations of "screen [size], large"→"standby time, short"; thus, the potential opinions having impact relations with each other can be obtained by correlating opinions nearby the related conjunctions. (2) the co-occurrence statistic method: opinions often co-occurring in adjacent contexts have certain correlated impact relations; opinions between objects having, with high possibility, impact relations can be obtained by counting the opinions with high frequency in the co-occurrence relations; by means of these methods as described above, the potential opinions having impact relations with each other are obtained.

The ways of extracting as illustrated here are not limiting the scope of the present disclosure. Those skilled in the art can also extract the opinions having impact relations in other ways.

The extraction unit 210 outputs the data of the extracted opinions having impact relations to the analysis unit 215. The analysis unit 215 analyzes the extracted respective opinions received from the extraction unit 210. More specifically, the analysis unit 215 analyzes the sentiment orientation of the respective opinions received from the extraction unit 210 and obtains sentiment impact relations between the respective correlated opinions.

The sentiment analyzing technology of analyzing the sentiment orientations of opinions and the impact relations between the sentiment orientations is a kind of classification technology. More specifically, the opinions are classified into two classes: commendatory (positive polarity) and derogatory (negative polarity). The method for machine learning can be used to train a classifier. The method for emotional word table can also be used to calculate sentiment polarities of opinions through the polarities of the emotional words recorded in the word table. Sentiment tendencies (commendatory, derogatory) of the opinions in all opinions are analyzed by the sentiment analyzing method, thereby sentiment impact relations between the opinions are determined, and the opinions between objects are converted into the sentiment impact relations between the objects.

The above analyzing method is not limiting the technical scope of the present disclosure, and those skilled in the art can use other analyzing methods to acquire the sentiment orientations of opinions and the impact relations between the sentiment orientations.

According to the result of sentiment analyzing, a sentiment orientation can be a positive polarity or a negative polarity. For example, as shown in FIG. 1, the sentiment orientation of "the display card, high" to "the display effect, legible" is a positive polarity, and the sentiment orientation of "the size of screen, large" to "the display effect, legible" is also a positive polarity. More specifically, the former has a positive and advantageous impact on the latter. However, the sentiment orientation of "the size of screen, large" to "the standby time, long" is a negative polarity, and has a negative and adverse impact. Furthermore, the sentiment orientations of the opinions "the display effect, legible", "the size of the screen, large" and "the standby time, long" and to "the feeling of playing an E-game, good" are also positive polarities. The analysis unit 215 outputs the above analysis results to the generation unit 220.

The generation unit 220 establishes correlations between the opinions having sentiment orientation based impact relations in accordance with the analysis results input from the analysis unit 215, so as to form "relation pairs" having the sentiment orientation based impact relations, i.e. "opinion pairs", in which the impacted opinions are referred to as the implicit opinions.

For example, the following opinion pairs can be obtained by the sentiment impact relations obtained in the analysis unit 215:

"the performance of display card, high"→"the display effect, legible" (positive polarity);

"the size of the screen, large"→"the display effect, legible" (positive polarity);

"the size of the screen, large"→"the standby time, short" (negative polarity);

"the size of the screen, large"→"the feeling of playing an E-game, good" (positive polarity);

"the display effect, legible"→"the feeling of playing an E-game, good" (positive polarity);

"the standby time, long"→"the feeling of playing an E-game, good" (positive polarity).

Furthermore, according to another embodiment of the present disclosure, on the basis of "the performance of display card, high"→"the display effect, legible" (positive polarity) and "the display effect, legible"→"the feeling of playing an E-game, good" (positive polarity), the opinion pairs can further be obtained as follows:

"the performance of display card, high"→"the feeling of playing an E-game, good" (positive polarity).

Here, the latter opinion impacted in each pair of opinions having sentiment impact relations is an implicit opinion, for example, "the display effect, legible", "the standby time, short" and "the feeling of playing an E-game, good".

The generation unit 220 can count a plurality of opinions to generate a database including the opinion pairs having the sentiment orientation based impact relations. More specifically, a plurality of the opinion pairs having the sentiment impact relations as described above are obtained by counting a plurality of object-oriented opinions, so as to establish a sentiment impact relation database.

A method for counting a plurality of opinions to form a database can be but not limited to the following: all cases of the opinion pairs having the sentiment orientation based impact relations "object_1, polarity_1"→"object_2, polarity_2" are counted in the plurality of collected opinions. There are totally four cases which respectively are as follows:

"object_1, positive polarity"→"object_2, positive polarity"

"object_1, positive polarity"→"object_2, negative polarity"

"object_1, negative polarity"→"object_2, positive polarity"

"object_1, negative polarity"→"object_2, negative polarity"

The above cases indicate the distribution of the sentiment impact relations between the object_1 and the object_2. The generation unit 220 indicates the credibility and weights of a certain impact relation between the objects by counting such distribution and determining one confidence score for each impact relation. The opinion pairs having the sentiment impact relations and their confidence score are stored in the database, so that the sentiment impact relation database as described above is formed which can be used for searching and employing implicit opinions.

The confidence score can be obtained by calculating the distribution ratio of each case to all cases, and can also be obtained by other statistic methods. For example, the calculation of the confidence score can be but not limited to the following: when calculating the confidence score, the distribution of the sentiment impact relations of the respective opinion pairs is taken into account. For example, when calculating the confidence score of "the size of the screen, large" (referred to as an impacting opinion hereinafter) to "the display effect, legible" (referred to as an impacted opinion, i.e. an implicit opinion, hereinafter), it is to be considered in total how many impacting opinions impact the implicit opinion. Here, since there are totally two impacting opinions, "the size of the screen, large" and "the performance of display card, high", which can have impact on the implicit opinion "the display effect, legible", the confidence scores of the impacting opinions "the size of the screen, large" and "the performance of display card, high" to the implicit opinion "the display effect, legible" are 50% respectively, which indicates the possibility that the implicit opinion "the display effect, legible" can be reasoned from the impacting opinion "the size of the screen, large" or "the performance of display card, high" as well as the influence degree on the implicit opinion "the display effect, legible" are 50% respectively.

It can be known from what is described above that the method for calculating the confidence scores is as follows:

$$\text{confidence score} = \frac{1}{\text{the number of impacting opinions}}$$

It means that the confidence score (influence degree) of a certain impacting opinion to an implicit opinion is the reciprocal of the number of all opinions impacting on the implicit opinion.

According to the above description, and by combining the calculated confidence scores, the opinion pairs can be obtained as follows:

"the performance of display card, high"→"the display effect, legible" (positive polarity, 50%);

"the size of the screen, large"→"the display effect, legible" (positive polarity, 50%);

"the size of the screen, large"→"the standby time, short" (negative polarity, 100%);

"the size of the screen, large"→"the feeling of playing an E-game, good" (positive polarity, 33.33%);

"the display effect, legible"→"the feeling of playing an E-game, good" (positive polarity, 33.33%);

"the standby time, long"→"the feeling of playing an E-game, good" (positive polarity, 33.33%).

According to another embodiment of the present disclosure, depending on "the performance of display card, high"→"the display effect, legible" (positive polarity, 50%) and "the display effect, legible"→"the feeling of playing an E-game, good" (positive polarity, 33.33%), the confidence score of the opinion "the performance of display card, high" to "the feeling of playing an E-game, good" can further be obtained as follows:

$$50\% \times 33.33\% = 16.67\%,$$

More specifically, the opinion pairs can be obtained as follows:

"the performance of display card, high"→"the feeling of playing an E-game, good" (positive polarity, 16.67%).

The above method for calculating confidence scores is not limiting the scope of the present disclosure, and those skilled in the art can employ any other method to calculate the confidence scores without affecting the scope of the present disclosure.

The established sentiment impact relation database can be located inside of the device 200 of the present disclosure and be stored in the memory, and can also be located outside of the device 200 of the present disclosure. According to another embodiment of the present disclosure, when there are opinion pairs having sentiment impact relations in original opinions, such opinion pairs with the sentiment impact relations can also be stored directly into the sentiment impact relation database. For example, in original comments, there is a comment "the display card is very good, and the feeling of playing an E-game is good". In this case, an opinion pair having sentiment impact relations, "the performance of display card, high" "the feeling of playing an E-game, good", can be obtained directly.

When a sentiment impact relation is taken into account, the influence thereof in a general domain can be considered, and the influence thereof in a specific domain can also be considered. For example, when considering "the size of the screen, large", the sentiment impact relations can be established only in the specific domain of the corresponding laptop, for example, it is a positive polarity for "the display effect, legible". Of course, the sentiment impact relations can also be established in a general domain, for example, "the size of the screen, large" is of positive polarity for "the eyesight, good". Here, compared with "the display effect, legible", "the eyesight, good" is an opinion in a more general domain. In this way, according to another embodiment of the present disclosure, different sentiment impact relation databases can be established for different requirements, and the scopes of the content of the databases can be properly set depending on the requirements.

Figure 3:
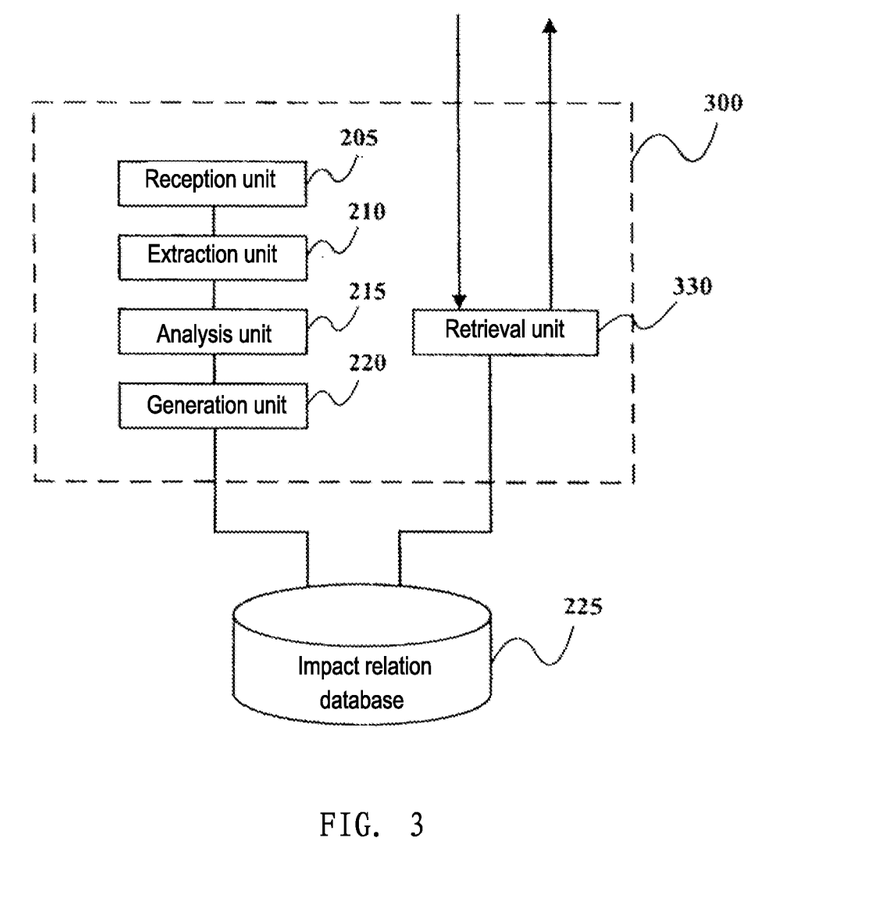
FIG. 3 is a block diagram showing a device for generating/retrieving opinions having impact relations according to another embodiment of the disclosure.

FIG. 3 is a block diagram showing a device for generating/retrieving opinions having sentiment orientation based impact relations according to another embodiment of the present disclosure. The same units in FIG. 3 as those shown in FIG. 2 are denoted with the same reference numbers, and detailed descriptions thereof are omitted.

The difference from the device 200 as shown in FIG. 2 is that the device 300 for generating/retrieving opinions having the sentiment orientation based impact relations according to another embodiment of the present disclosure as shown in FIG. 3 further includes a retrieval unit 330 which is connected to the sentiment impact relation database 225. The retrieval unit 330 retrieves opinions having the impact relations with the queried object in the database in response to the query received from outside. The queried object has sentiment orientation based impact relations with the opinion, where the impacted opinion is an implicit opinion.

According to one embodiment of the present disclosure, users can directly input the question to be queried in an input window of a display interface of, for example, a browser so as to perform searching. For example, the users can directly input questions of "the type of a certain kind of laptop" and "how is the feeling of playing an E-game?" in the input window of the display interface of the browser. After the "search" button is clicked, the browser searches over the Internet, but does not obtain information about "the feeling of playing an E-game" of the kind of laptop to be queried. In such a case, the browser can automatically start the retrieval unit 330, or the browser can also feed back a message that the related information is not found (by displaying text or icon on the display interface or notifying through speech) and the "start" button displayed on the screen is manually clicked by the user to start the retrieval unit 330. After receiving the start command, the retrieval unit 330 extracts the object to be queried, "the feeling of playing an E-game", from the queried question as described above, and sets a retrieval range depending on the input "the type of the certain kind of laptop", and performs retrieving in the impact relation database 225 to look for opinions having the impact relations with the object.

When the retrieval unit 330 finds out the opinions having the sentiment orientation based impact relations with "the feeling of playing an E-game" in the impact relation database 225, it outputs the retrieved opinion pairs or only the retrieved implicit opinions via the user interface such as a display so as to notify the respective opinions which have been found to the user, for example, "the size of the screen, large"→"the feeling of playing an E-game, good" (positive polarity, 33.33%), "the display effect, legible"→"the feeling of playing an E-game, good" (positive polarity, 33.33%), "the standby time, long"→"the feeling of playing an E-game, good" (positive polarity, 33.33%) and "the performance of display card, high"→"the feeling of playing an E-game, good" (positive polarity, 16.67%).

The user can obtain other users' comments on "the feeling of playing an E-game" on the kind of laptop of interest to the user, in accordance with the above respective opinions seen by the user in the above retrieval result. In this way, according to the database for opinions having the sentiment orientation based impact relations which is generated by the methods and devices of the present disclosure, the opinions related to only one object can be supplemented by other opinions having the sentiment impact relations with the object.

According to another embodiment of the present disclosure, when a user of the device 300 of the present disclosure receives opinions or comments on a certain object by, for example, operations of web browsing, if the opinions are not those desired by the user, the user can issue instructions to the retrieval unit 330 through a I/O unit to retrieve in the impact relation database 225 directly for the opinions received from outside, so as to look for opinions having the sentiment orientation based impact relations with the received opinions.

When the retrieval unit 330 finds out the related opinions in the impact relation database 225, it outputs the retrieved opinions to outside so as to notify the found opinions to the user via the user interface such as a display or a speaker. For example, the user is interested in a certain kind of laptop and expects to look for some comments on playing an E-game using the kind of laptop over network, but what is seen by the user on web pages is only the comment "the display card is very good", and the user does not know what relation is between "the display card is very good" and playing an E-game. In this case, the user can input "the display card is very good" or similar texts in the input window of the display interface of the browser and click "search" to issue an instruction of starting retrieval to the retrieval unit 330. After receiving the instruction, the retrieval unit 330 begins to retrieve in the impact relation database 225 so as to look for opinions having the impact relations with the received opinion.

When the retrieval unit 330 finds the opinions related to "the display card, good", for example "the display effect, legible" and "the feeling of playing an E-game, good", in the impact relation database 225, it outputs the retrieved opinions as described above so as to notify the found opinions to the user via the user interface such as a display. The output opinions such as "the display effect, legible" and "the feeling of playing an E-game, good" are implicit opinions for the queried object "the display card is very good". Thus, the user can obtain the comment "the feeling of playing an E-game, good", according to the comment "the display card is very good" which is seen by the user on web pages. Furthermore, the user can also issue an instruction of starting retrieval to the retrieval unit 330 by directly clicking the link of "the display card is very good" on the display interface of the browser.

The method for triggering the retrieval unit 330 to perform retrieving is not limiting the scope of the present disclosure, and those skilled in the art can also start the retrieval operation of the retrieval unit 330 by other known means.

Figure 4:
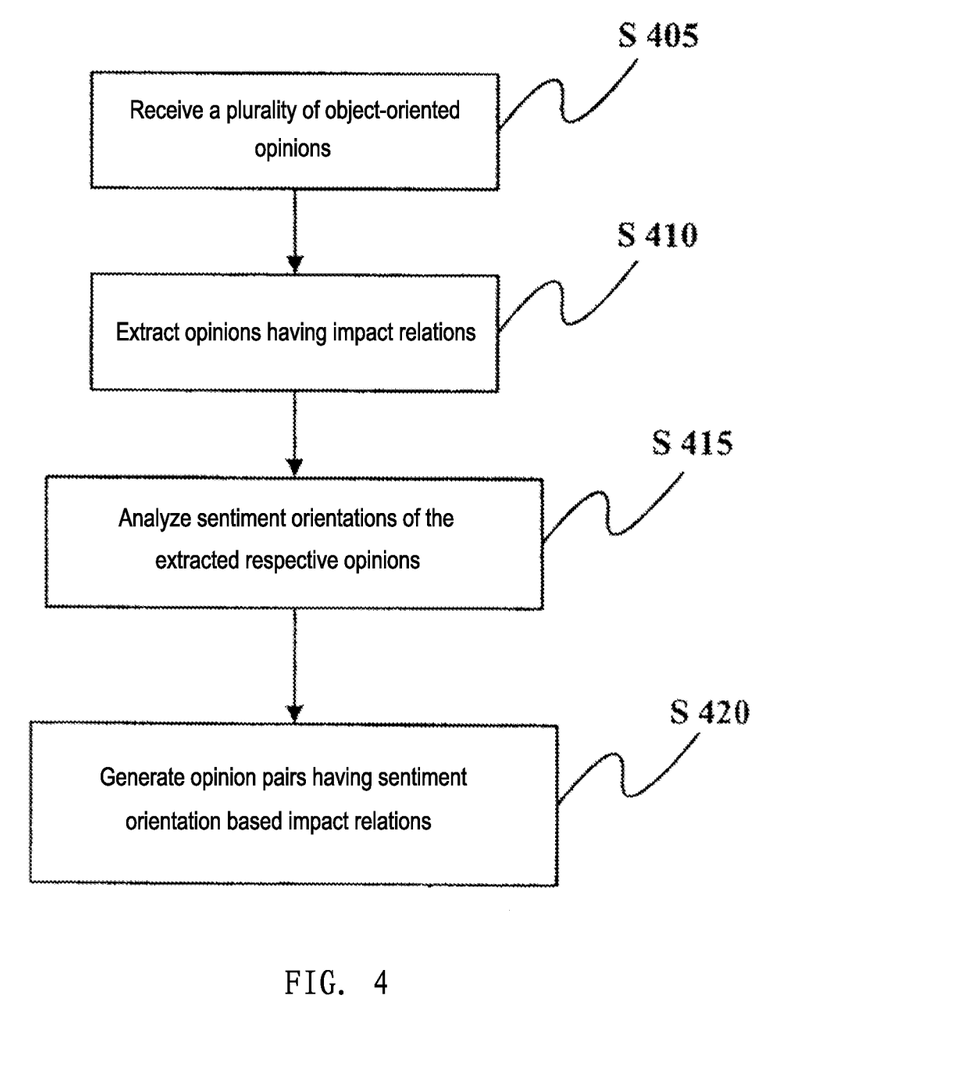
FIG. 4 is a flow chart showing a method for generating opinion pairs having sentiment orientation based impact relations according to one embodiment of the disclosure.

FIG. 4 is a flow chart showing a method for generating the opinion pairs having the sentiment orientation based impact relations according to an embodiment of the disclosure.

As shown in FIG. 4, in step S405, multiple object-oriented opinions are received. In step S410, the opinions having impact relations are extracted from the multiple object-oriented opinions. In step S415, the sentiment orientations of the extracted respective opinions are analyzed. In step S420, based on the analysis result, the opinions having the sentiment orientation based impact relations are correlated as opinion pairs, where the impacted opinions form implicit opinions.

The above step S405 can be carried out by the reception unit 205 in the device 200 or device 300 according to the present disclosure. The above step S410 can be carried out by the extraction unit 210 in the device 200 or device 300 according to the present disclosure. The above step S415 can be carried out by the analysis unit 215 in the device 200 or device 300 according to the present disclosure. The above step S420 can be carried out by the generation unit 220 in the device 200 or device 300 according to the present disclosure.

One embodiment according to the present disclosure can further include the step of calculating confidence scores of (sentiment) impact relations to express the weight of the sentiment impact relations, that is, the weight of the impact of the sentiment orientations of opinions for a certain object on the sentiment orientations of opinions for another object. The above step can be carried out by the generation unit 220 in the device 200 or device 300 according to the present disclosure.

One embodiment according to the present disclosure can further include the step of counting a plurality of opinions to generate (sentiment) impact relation database. More specifically, a plurality of opinion pairs having the sentiment impact relations as described above are obtained by counting a plurality of object-oriented opinions, thus an impact relation database is established. The above step can be carried out by the generation unit 220 in the device 200 or device 300 according to the present disclosure.

Another embodiment according to the present disclosure can further include the step of retrieving opinions having the impact relations with a query in the above impact relation database in response to receiving the query from outside. The above step can be carried out by the retrieval unit 330 in the device 300 according to the present disclosure.

Figure 5:
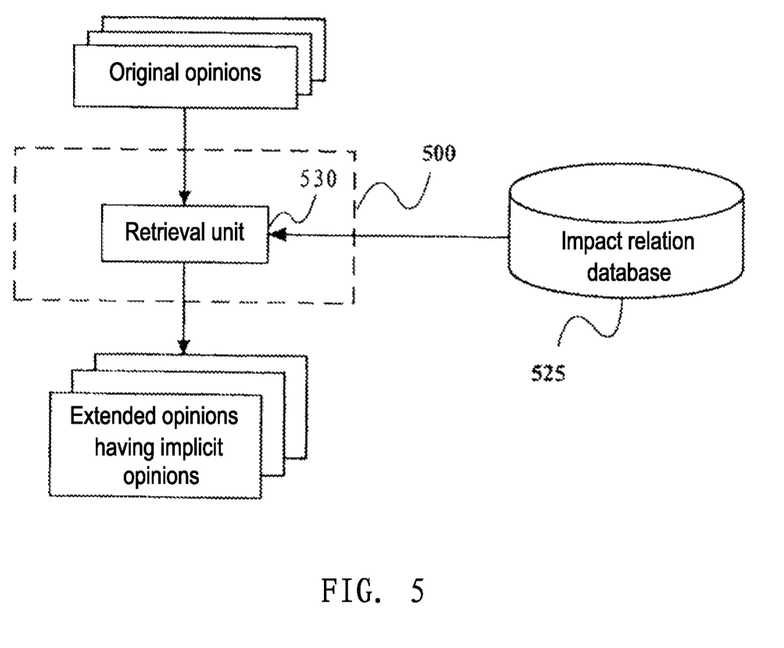
FIG. 5 is a block diagram showing a device for retrieving opinions having impact relations according to a further embodiment of the disclosure.

FIG. 5 is a block diagram showing a device for retrieving opinions having impact relations according to a further embodiment of the disclosure. As shown in FIG. 5, the device 500 for retrieving opinions having sentiment impact relations according to a further embodiment of the present disclosure includes a retrieval unit 530.

The device 500 for retrieving opinions having the sentiment impact relations according to a further embodiment of the present disclosure can further include: a CPU (Central Processing Unit) for executing related programs so as to process various data and to control operations of various units in the device 500; a ROM (Read Only Memory) for storing various programs required for the CPU to perform various processing and controlling; a RAM (Random Access Memory) for storing intermediate data temporarily produced by the CPU in the procedure of processing and controlling; an I/O (Input/Output) unit for connecting to external devices so as to transfer various data between the external devices and the device 500 of the present disclosure; a user I/F (Interface) unit, including but not limited to a keyboard, a mouse, a display means for inputting/outputting view data which can be implemented by various display apparatus, and an audio means which can input/output sounds, for performing mutual operations with users and receiving operational commands input by users; and a memory for storing various data of the device 500 according to the present disclosure.

The respective units as described above are not limiting the scope of the present disclosure. According to one embodiment of the present disclosure, the function of the retrieval unit 530 can also be carried out by a functional software in combination with the above CPU, ROM, RAM, I/O, I/F and memory.

The retrieval unit 530 retrieves opinions having the impact relations with the object of a query in a database 525 in response to receiving the query from outside. There is a sentiment orientation based impact relation between the queried object and the opinion, in which the impacted opinion is an implicit opinion. According to one embodiment of the present disclosure, the user can directly input questions to be queried in for example an input window of a display interface of a browser to perform searching. For example, the user can directly input questions of "the type of a certain kind of laptop" and "how is the feeling of playing an E-game?" in the input window of the display interface of the browser. After the "search" button is clicked, the browser searches the Internet, but does not obtain information on "the feeling of playing an E-game" on the kind of laptop to be queried. In such a case, the browser can automatically start the retrieval unit 530, or the browser can also feed back a message that the related information is not found (by displaying text or icon on the display interface or notifying through speech), and the "start" button displayed on the screen is manually clicked by the user to start the retrieval unit 530.

After receiving the start command, the retrieval unit 530 extracts the object to be queried, "the feeling of playing an E-game", from the queried question as described above, and sets a retrieval range depending on the input "the type of the certain kind of laptop", and performs retrieving in the impact relation database 525 to look for opinions having the sentiment orientation based impact relations with the object. When the retrieval unit 530 finds the opinions having the sentiment orientation based impact relations with "the feeling of playing an E-game" in the impact relation database 525, it outputs the retrieved opinions via a user interface such as a display so as to notify respective found opinions to the user, such as "the size of the screen, large"→"the feeling of playing an E-game, good", "the display effect, legible"→"the feeling of playing an E-game, good", "the standby time, long"→"the feeling of playing an E-game, good" and "the performance of display card, high"→"the feeling of playing an E-game, good".

Thus, the user can obtain other users' comments on "the feeling of playing an E-game" using the kind of laptop of interest to the user, in accordance with the above respective opinions seen by the user in the above retrieval result. In this way, based on the database for opinions having the sentiment orientation based impact relations which is generated by methods and devices according to the present disclosure, the opinions related to only one object can be supplemented by other opinions having the sentiment impact relations with the object.

According to another embodiment of the present disclosure, the retrieval unit 530 can also retrieve opinions having the sentiment orientation based impact relations with the received opinions in the impact relation database 225 directly in response to the opinions received from outside, and output the retrieved opinions. More specifically, the retrieval unit 530 receives others' opinions (comments) from outside. For example, the user can find others' opinions from a network through a browser. Depending on instructions input by the user from an I/O interface, the retrieval unit 530 searches for, based on the obtained others' opinions, opinions having the impact relations with the opinions in the impact relation database 525, and outputs the obtained respective opinions as extended opinions.

Here, the opinion pairs of a plurality of opinions having the impact relations based on sentiment orientations are included in the impact relation database 525, and the impacted opinions in the opinion pairs are implicit opinions. For example, the user finds the comment "the size of the screen is large" on a certain kind of laptop over a network, but the user is interested in comments on the display effect. In such a case, the user can input "the size of the screen is large" or similar texts in the input window of the display interface of the browser and click the "search" button to issue an instruction of starting retrieval to the retrieval unit 530. After receiving the instruction, the retrieval unit 530 retrieves in the database 525. Upon finding out the opinion pairs of "the screen, large"→"the display effect, legible" (positive polarity, 50%), "the size of screen, large"→"the standby time, short" (negative polarity, 100%) and "the size of screen, large"→"the feeling of playing an E-game, good" (positive polarity, 33.33%) in the database 525, the retrieval unit 530 outputs the respective found opinion pairs as described above via a user interface such as a display "the display effect, legible", "the standby time, short" and "the feeling of playing an E-game, good" in the output opinions are the implicit opinions for the queried object "the size of the screen is large". Thus, the user can obtain other users' opinions on the display effect of the kind of laptop desired by the user. Furthermore, the user can also issue an instruction of starting retrieval to the retrieval unit 530 by directly clicking the link of "the size of the screen is large" on the display interface of the browser. The steps of starting the retrieval unit 530 to perform retrieving described above is not limiting the scope of the present disclosure, and those skilled in the art can also start the retrieval operation of the retrieval unit 530 with other known means.

Figure 6:
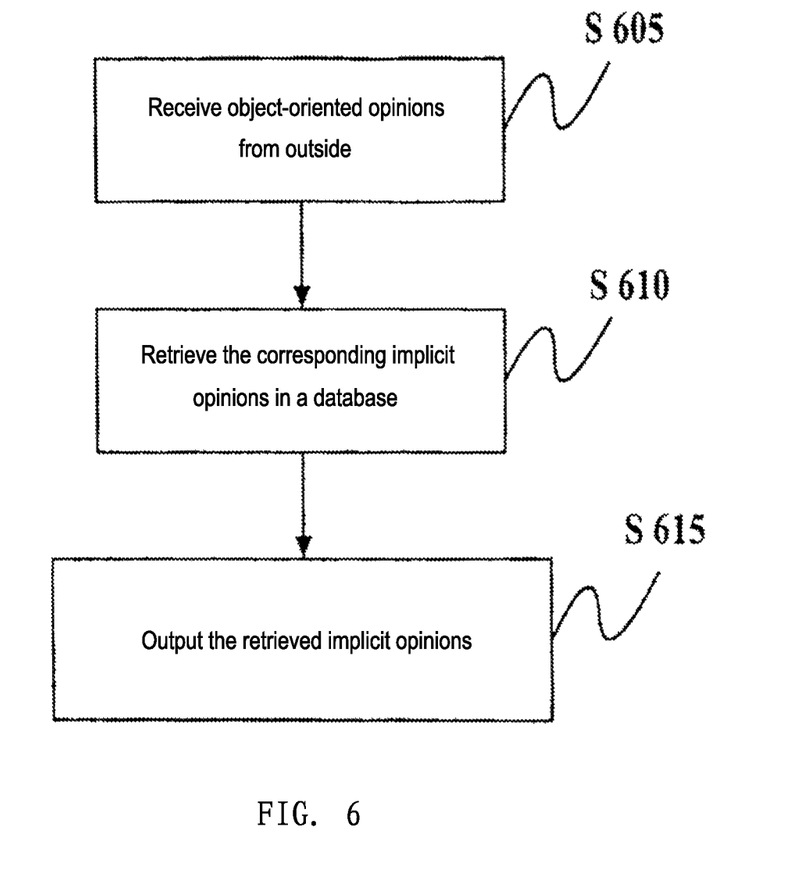
FIG. 6 is a flow chart showing a method for retrieving opinions having impact relations according to a further embodiment of the disclosure.

FIG. 6 is a flow chart showing a method for retrieving the opinions having the impact relations according to a further embodiment of the disclosure.

As shown in FIG. 6, in step S605, a query is received from outside. In step S610, opinions having impact relations with the object of the received query are retrieved in a database. In step S615, the retrieved opinions are output, where the object of the query has the sentiment orientation based impact relations with the retrieved opinions in which the impacted opinions are implicit opinions.

The above steps S605, S610 and S615 can be carried out by the retrieval unit 530 shown in FIG. 5.

The above embodiments of the present disclosure are only exemplary description in which the contents of the impact relation databases are not limited to the illustrated examples and can further include all kinds of users' opinions and comments existing over a network.

The above embodiments of the present disclosure are only exemplary description, and their specific structures and operations are not limiting the scope of the disclosure. Those skilled in the art can combine different parts and operations in the above respective embodiments to produce new implementations which equally accord with the conception of the present disclosure.

Embodiments of the present disclosure can be implemented by hardware, software and firmware or in a combination thereof, and the method of implementation is not limiting the scope of the present disclosure.

The connection relationships between respective functional elements (units) in embodiments of the present disclosure are not limiting the scope of the present disclosure, in which one or multiple functional element(s) can contain or be connected to any other functional elements.

Although several embodiments of the present disclosure has been shown and described in combination with the attached drawings above, various variations and modifications which still fall into the scope of claims and their equivalents of the present disclosure can be made to these embodiments without departing from the spirit and principle of the present disclosure.

What is claimed is:

1. A device for generating opinion pairs having sentiment orientation based impact relations, comprising:
    a central processing unit (CPU) receiving a plurality of object-oriented opinions,
    said CPU extracting impact-related object-oriented opinions from said plurality of object-oriented opinions, said impact-related object-oriented opinions comprising any object-oriented opinions in said plurality of object-oriented opinions and having impact relations with any other object-oriented opinions in said plurality of object-oriented opinions,
    said CPU analyzing said impact-related object-oriented opinions to determine sentiment orientations between pairs of said impact-related object-oriented opinions, each sentiment orientation indicating whether a first object-oriented opinion has one of a positive impact and a negative impact on a second object-oriented opinion,
    said CPU calculating confidence scores for said impact relations between said impact-related object-oriented opinions, said CPU establishing an impact relation database and storing, in said database, each pair of said impact-related object-oriented opinions with an associated sentiment orientation and an associated confidence score,
    said CPU calculating said confidence scores comprising calculating said associated confidence score for each specific pair of said impact-related object-oriented opinions comprising a specific first object-oriented opinion that impacts a specific second object-oriented opinion by determining a number of other pairs of said impact-related object-oriented opinions that comprise other first object-oriented opinions that impact said specific second object-oriented opinion and dividing 1 by said number.

2. The device according to claim 1, said CPU counting said plurality of object-oriented opinions to generate impact relation database.

3. The device according to claim 1, said CPU retrieving, from said impact relation database in response to a query, any of said pairs of said impact-related object-oriented opinions associated with an object of said query.

4. The device according to claim 1, in each of said pairs of said impact-related object-oriented opinions, said second object-oriented opinion impacted by said first object-oriented opinion is an implicit opinion.

5. The device according to claim 1, for each of said pairs of said impact-related object-oriented opinions, said associated confidence score indicates a degree of influence said first object-oriented opinion has on said second object-oriented opinion.

6. A method for generating opinion pairs having sentiment orientation based impact relations, comprising:
   receiving, by a computer, a plurality of object-oriented opinions;
   extracting, by said computer, impact-related object-oriented opinions from said plurality of object-oriented opinions, said impact-related object-oriented opinions comprising any object-oriented opinions in said plurality of object-oriented opinions and having impact relations with any other object-related opinions in said plurality of object-oriented opinions;
   analyzing, by said computer, said impact-related object-oriented opinions to determine sentiment orientations between pairs of said impact-related object-oriented opinions, each sentiment orientation indicating whether a first object-oriented opinion has one of a positive impact and a negative impact on a second object-oriented opinion;
   calculating, by said computer, confidence scores for said impact relations between said impact-related object-oriented opinions; and
   establishing, by said computer, an impact relation database and storing, in said database, each pair of said impact-related object-oriented opinions with an associated sentiment orientation and an associated confidence score,
   said calculating of said confidence scores comprising calculating said associated confidence score for each specific pair of said impact-related object-oriented opinions comprising a specific first object-oriented opinion that impacts a specific second object-oriented opinion by determining a number of other pairs of said impact-related object-oriented opinions that comprise other first object-oriented opinions that impact said specific second object-oriented opinion and dividing 1 by said number.

7. The method according to claim 6, further comprising retrieving, by said computer from said impact relation database in response to a query, any of said pairs of said impact-related object-oriented opinions associated with an object of said query.

8. The method according to claim 7, said second object-oriented opinion impacted by said first object-oriented opinion in each of said pairs of said impact-related object-oriented opinions comprising an implicit opinion.

9. The method according to claim 6, for each of said pairs of said impact-related object-oriented opinions, said associated confidence score indicates a degree of influence said first object-oriented opinion has on said second object-oriented opinion.

10. A device for generating and retrieving opinion pairs having sentiment orientation based impact relations, comprising:
   a central processing unit (CPU) receiving a plurality of object-oriented opinions,
   said CPU extracting impact-related object-oriented opinions from said plurality of object-oriented opinions, said impact-related object-oriented opinions comprising any object-oriented opinions in said plurality of object-oriented opinions and having impact relations with any other object-oriented opinions in said plurality of object-oriented opinions,
   said CPU analyzing said impact-related object-oriented opinions to determine sentiment orientations between pairs of said impact-related object-oriented opinions, each sentiment orientation indicating whether a first object-oriented opinion has one of a positive impact and a negative impact on a second object-oriented opinion,
   said CPU calculating confidence scores for said impact relations between said impact-related object-oriented opinions, said CPU establishing an impact relation database and storing, in said database in a memory unit, each pair of said impact-related object-oriented opinions with an associated sentiment orientation and an associated confidence score,
   said CPU retrieving, from said impact relations database in response to a query, any of said pairs of said impact-related object-oriented opinions associated with an object of said query,
   said CPU calculating said associated confidence score for a specific pair of said impact-related object-oriented opinions, said specific pair comprising a specific first object-oriented opinion that impacts a specific second object-oriented opinion, by determining a number of other pairs of said impact-related object-oriented opinions that comprise other first object-oriented opinions that impact said specific second object-oriented opinion and dividing 1 by said number.

11. The device according to claim 10, said CPU counting said plurality of object-oriented opinions to generate said impact relation database.

12. The device according to claim 10, said second object-oriented opinion impacted by said first object-oriented opinion in each of said pairs of said impact-related object-oriented opinions being an implicit opinion.

13. The device according to claim 10, for each of said pairs of said impact-related object-oriented, said associated confidence score indicates a degree of influence said first object-oriented opinion has on said second object-oriented opinion.

* * * * *